US 6,670,439 B2

(12) United States Patent
Sakamoto et al.

(10) Patent No.: US 6,670,439 B2
(45) Date of Patent: Dec. 30, 2003

(54) ROOM TEMPERATURE CURABLE ORGANOPOLYSILOXANE COMPOSITION

(75) Inventors: Takafumi Sakamoto, Gunma-ken (JP); Tsuneo Kimura, Gunma-ken (JP); Yoshihide Wakayama, Tokyo (JP)

(73) Assignee: Taisei Corporation, Tokyo (JP)

( * ) Notice: Subject to any disclaimer, the term of this patent is extended or adjusted under 35 U.S.C. 154(b) by 0 days.

(21) Appl. No.: 10/268,897

(22) Filed: Oct. 11, 2002

(65) Prior Publication Data

US 2003/0120017 A1 Jun. 26, 2003

(30) Foreign Application Priority Data

Oct. 12, 2001 (JP) ........................................ 2001-315055
Mar. 19, 2002 (JP) ........................................ 2002-075571

(51) Int. Cl.$^7$ .............................................. C08G 77/26
(52) U.S. Cl. ........................ 528/34; 523/212; 524/864
(58) Field of Search ........................ 528/34; 523/212; 524/864

(56) References Cited

U.S. PATENT DOCUMENTS 4,695,617 A * 9/1987 Inoue et al. .................. 528/32
4,960,847 A * 10/1990 Arai et al. .................... 528/32
5,945,463 A * 8/1999 Kawabuchi et al. ........... 522/96
6,337,365 B1 * 1/2002 Matsuo et al. ............... 524/277

FOREIGN PATENT DOCUMENTS

| JP | 61-209266 | 9/1986 |
| JP | 3-56564 | 3/1991 |
| JP | 7-331076 | 12/1995 |
| JP | 2565333 | 10/1996 |

* cited by examiner

*Primary Examiner*—Margaret G. Moore
(74) *Attorney, Agent, or Firm*—Birch, Stewart, Kolasch & Birch, LLP

(57) ABSTRACT

A room temperature curable organopolysiloxane composition of the ketone removal type comprising a diorganopolysiloxane having a minimized content of low-molecular-weight organopolysiloxanes as a base polymer, and an alkenoxysilane as a crosslinking agent does emit essentially no low-molecular-weight siloxanes and organic matter with the passage of time after curing and is suitable for use as a sealant in a clean room and as a sealant or adhesive on electrical and electronic parts.

12 Claims, No Drawings

ROOM TEMPERATURE CURABLE ORGANOPOLYSILOXANE COMPOSITION

The nonprovisional application claims priority under 35 U.S.C. §119(a) on Patent Application Nos. 2001-315055 and 2002-075571 filed in JAPAN on Oct. 12, 2001 and [2002-075571] Mar. 19, 2002 respectively, which is herein incorporated by reference.

This invention relates to a room temperature curable organopolysiloxane composition of the ketone-removal type for use in a clean room where the emission of low-molecular-weight siloxanes is troublesome, especially as a sealant or adhesive in a semiconductor clean room or on electrical and electronic parts.

BACKGROUND OF THE INVENTION

For seals at joints, air-tight seals on ducts and piping, and seals around filters used in the construction and utility installation of clean rooms, seals to fittings installed in semiconductor facilities such as semiconductor manufacturing apparatus, seals on utility piping for electricity and gas feed to such facilities, seals and adhesives on electric and electronic parts, frequent use is made of room temperature curable organopolysiloxane compositions because of their weather resistance, heat resistance, electrical properties and ease of working. The room temperature curable organopolysiloxane compositions generally comprise an organopolysiloxane which contains low-molecular-weight siloxanes as a base polymer, and low-boiling silane compounds as curing agents or additives. With the passage of time after curing, cured compositions (silicone rubber) give off volatile low-molecular-weight siloxanes, unreacted silane compounds, as well as low-molecular-weight siloxanes arising from cracking of the cured polymer. Such emissions are undesired when the compositions are used in the above-described applications. More particularly, undesired emissions have a detrimental influence on equipment in a clean room. When the compositions are applied to electric and electronic parts, low-molecular-weight siloxanes or low-boiling silane compounds volatilize at contacts and similar sites where heat accumulates, and are ignited with sparks that can generate at the contacts and thus burned into silicon dioxide, which in turn, deposit on the contacts. As a consequence, the contacts become electrically insulated, resulting in a contact failure that motor circuits, relay circuits or other circuits fail to correctly function.

Known in the prior art are a room temperature curable organopolysiloxane composition in which the content of low-molecular-weight organopolysiloxane having a vapor pressure of at least $10^{-2}$ mmHg is 0.3% by weight or lower (JP-A 61-209266) and a room temperature curable organopoly-siloxane composition in which the content of low-molecular-weight organopolysiloxane having a vapor pressure of at least $10^{-3}$ mmHg is 0.7% by weight or lower (Japanese Patent No. 2,565,333). These compositions are still insufficient in the above-described applications, typically joint seals in a clean room.

Many countermeasures have been taken to these problems. With respect to the base polymer, recent improvements in such techniques as stripping and solvent washing made it possible to produce polymers having a minimized content of low-molecular-weight organopoly-siloxanes. It has become possible to clear even the very strict requirement that the content of low-molecular-weight organopolysiloxane having a vapor pressure of at least $10^{-12}$ mmHg is 0.1% by weight or lower as called for in the above-described applications.

With respect to the curing agent, a composition using a high-boiling α-silyl ester compound was proposed as eliminating the contact failure (JP-A 7-331076). With respect to the additive, the present inventors proposed the addition of an organic compound capable of coordinating with a metal (JP-A 3-56564).

The Japan Air Cleaning Association prescribes the substrate surface adsorption-thermal desorption method (adsorption test on silicon wafer) under JACA No. 34 as a standard for selecting a sealing material for use in a clean room, especially a semiconductor clean room. In view of this standard, silicone-base sealing materials comprising a base polymer, a curing agent and additives which have taken in the above-mentioned countermeasures fail to achieve satisfactory performance, and undesirable low-molecular-weight siloxanes are detected. It is noted that this test is to ascertain, after the sealing material is cured, whether or not low-molecular-weight siloxanes and organic compounds migrate therefrom to silicon wafers. It is a very important test upon selection of a material for use in a clean room where KrF excimer lasers and the like are used.

Whether or not low-molecular-weight siloxanes and organic compounds evolved with the passage of time after curing was ascertained by two methods: (1) a method for the analysis (purge and trap analysis) of volatile components from a cured material and (2) a method for the selection of a sealing material for use in a semiconductor clean room, that is, the substrate surface adsorption-thermal desorption method (the adsorption test on silicon wafer, JACA No. 34). It was found with the analysis method (1) that low-molecular-weight siloxanes, despite the absence prior to curing, are created, though in a minor amount, after curing and with the passage of time or by heating. It was found with the analysis method (2) that for all the existing silicone-base sealants, low-molecular-weight siloxanes and organic matter were detected.

SUMMARY OF THE INVENTION

An object of the present invention is to provide a room temperature curable organopolysiloxane composition which is suitable for use in a clean room and as a sealant or adhesive on electrical and electronic parts in that the cured composition does emit essentially no low-molecular-weight siloxanes with the passage of time.

It has been found that a room temperature curable organopolysiloxane composition of the ketone removal type comprising a diorganopolysiloxane having a significantly reduced content of low-molecular-weight organopolysiloxanes as a base polymer and an alkenoxysilane as a crosslinking agent, after curing, does produce essentially no low-molecular-weight siloxanes and organic matter with the passage of time, when examined by the above analysis methods. The composition is then suitable for use as a sealant in a clean room, especially in a semiconductor clean room, and as a sealant or adhesive on electrical and electronic parts.

Accordingly, the present invention provides a room temperature curable organopolysiloxane composition comprising (A) 100 parts by weight of a diorganopolysiloxane end-capped with a hydroxyl, alkoxy or alkenoxy radical and containing up to 0.1% by weight of low-molecular-weight organopolysiloxanes having a vapor pressure of at least $10^{-12}$ mmHg at 20° C., and (B) 0.5 to 30 parts by weight of a silane compound having a radical of the following general formula (1):

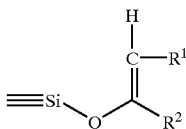

(1)

wherein $R^1$ and $R^2$ are independently hydrogen or a substituted or unsubstituted monovalent hydrocarbon radical, or a partial hydrolytic condensate thereof.

Preferably, the composition further comprises (C) 0.01 to 10 parts by weight of an organosilicon compound having a monovalent radical of the following general formula (2):

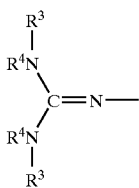

(2)

wherein $R^3$ and $R^4$ are independently hydrogen or a monovalent hydrocarbon radical, or a partial hydrolytic condensate thereof.

It is recommended that upon measurement by the substrate surface adsorption-thermal desorption method (the adsorption test on silicon wafer, JACA No. 34), a quantity of low-molecular-weight siloxanes and organic matter arising from the cured composition is up to 1.0 (ng$C_{16}$eq./cm$^2$).

DESCRIPTION OF THE PREFERRED EMBODIMENT

Component (A) in the room temperature curable organopolysiloxane composition of the invention is a diorganopolysiloxane serving as a base polymer. Any desired diorganopolysiloxane may be used as long as it is end-capped with a hydroxyl, $C_1$–$C_6$ alkoxy or $C_2$–$C_6$ alkenoxy radical. The preferred diorganopolysiloxane has the average compositional formula: $R^5SiO_{(4-c)/2}$ wherein $R^5$ is a substituted or unsubstituted monovalent hydrocarbon radical and c is 1.90 to 2.05 and is end-capped with a hydroxyl, alkoxy or alkenoxy radical. The hydrocarbon radicals represented by $R^5$ are preferably those of 1 to 10 carbon atoms, especially 1 to 8 carbon atoms, for example, alkyl radicals such as methyl, ethyl, propyl and butyl, alkenyl radicals such as vinyl and allyl, aryl radicals such as phenyl and tolyl, aralkyl radicals such as benzyl and 2-phenylethyl, and substituted ones of the foregoing radicals in which some or all of the hydrogen atoms are substituted with halogen atoms or the like, such as chloromethyl and 3,3,3-trifluoropropyl. More preferred diorganopolysiloxanes are represented by the following formula.

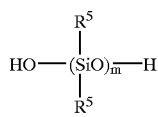

Some specific examples are given below:

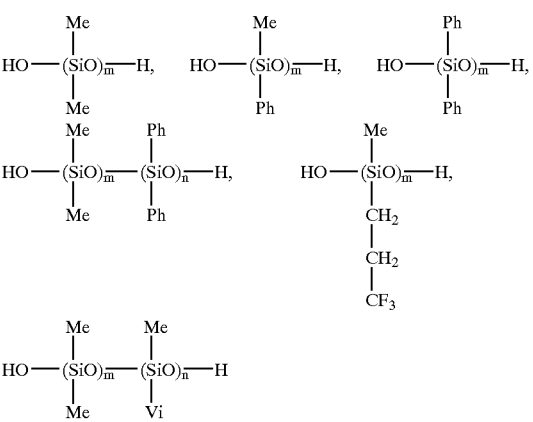

Me is methyl, Ph is phenyl, Vi is vinyl, m and n are such positive integers that the compound may have a viscosity of about 25 to about 1,000,000 cSt at 25° C.

In order that the cured composition be a good rubber elastomer having mechanical strength, the diorganopolysiloxane (A) should preferably have a viscosity at 25° C. of at least about 100 cSt, more preferably about 200 to 300,000 cSt, more preferably about 300 to about 100,000 cSt.

In the diorganopolysiloxane, the total content of low-molecular-weight organopolysiloxanes having a vapor pressure of at least $10^{-12}$ mmHg at 20° C. (typically linear organopolysiloxanes having a degree of polymerization of up to 20 and cyclic organopolysiloxanes having a degree of polymerization of 3 to 20) should be up to 0.1% by weight, especially up to 0.05% by weight. That is, a diorganopolysiloxane with a minimized content of low-molecular-weight organopolysiloxanes is used. It is noted that the content of low-molecular-weight organopolysiloxanes can be reduced by a stripping or solvent washing technique.

Component (B) is a silane compound having a radical of the following general formula (1) or a partial hydrolytic condensate thereof.

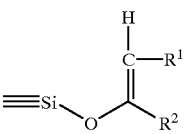

(1)

Herein $R^1$ and $R^2$ are each independently hydrogen or a substituted or unsubstituted monovalent hydrocarbon radical. The hydrocarbon radicals are preferably those of 1 to 10 carbon atoms, especially 1 to 8 carbon atoms, with examples being as enumerated for $R^5$.

The silane compound or partial hydrolytic condensate thereof (B) is essential in order that little or no low-molecular-weight siloxanes or organic matter be detected when analyzed by the substrate surface adsorption-thermal desorption method (the adsorption test on silicon wafer, JACA No. 34).

The preferred silane compound or partial hydrolytic condensate (B) is a silane compound of the following general formula (3) or partial hydrolytic condensate thereof.

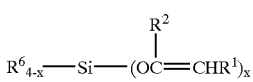
(3)

Herein $R^1$ and $R^2$ are as defined above, $R^6$ is a monovalent hydrocarbon radical having 1 to 10 carbon atoms, especially 1 to 8 carbon atoms, as defined for $R^5$. Illustrative examples include tetraisopropenoxysilane, methyltriisopropenoxysilane, vinyltriisopropenoxysilane, phenyltriisopropenoxysilane, dimethyldiisopropenoxysilane and partial hydrolytic condensates thereof.

Component (B) is used in an amount of 0.5 to 30 parts by weight, preferably 1 to 15 parts by weight per 100 parts by weight of component (A). On this basis, less than 0.5 part of component (B) leads to a cured product having insufficient mechanical strength. With more than 30 parts of component (B), there arise problems including low rubber strength after curing, difficulty to produce a desired rubber elastomer, and an economical loss.

Preferably, the room temperature curable organopolysiloxane composition further comprises (C) an organosilicon compound having a monovalent radical of the following general formula (2) or a partial hydrolytic condensate thereof.

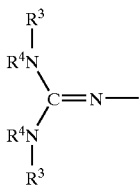
(2)

Herein $R^3$ and $R^4$ are each independently hydrogen or a monovalent hydrocarbon radical. The monovalent hydrocarbon radicals represented by $R^3$ and $R^4$ are preferably those of 1 to 10 carbon atoms, especially 1 to 8 carbon atoms, as enumerated for $R^5$. The radical of formula (2) may be bonded to a silicon atom via any linkage, preferably an alkylene or oxyalkylene radical.

The preferred organosilicon compounds (C) are, for example, compounds of the following general formula (4).

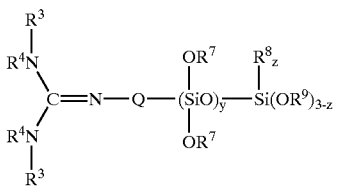
(4)

Herein $R^3$ and $R^4$ are as defined above; Q is an alkylene or oxyalkylene radical of 1 to 6 carbon atoms; $R^8$ is hydrogen, a monovalent hydrocarbon radical of 1 to 10 carbon atoms, especially 1 to 8 carbon atoms, or —$OSiR^8{}_a(OR^9)_{3-a}$ wherein "a" is 0, 1 or 2; $R^9$ is hydrogen or a monovalent hydrocarbon radical of 1 to 10 carbon atoms, especially 1 to 8 carbon atoms; y is an integer of 0 to 5, and z is 0, 1 or 2.

Illustrative examples of operable organosilicon compounds are given below. Note that Me is methyl, Et is ethyl, Pr is propyl, and Ph is phenyl:

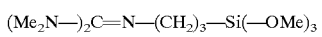

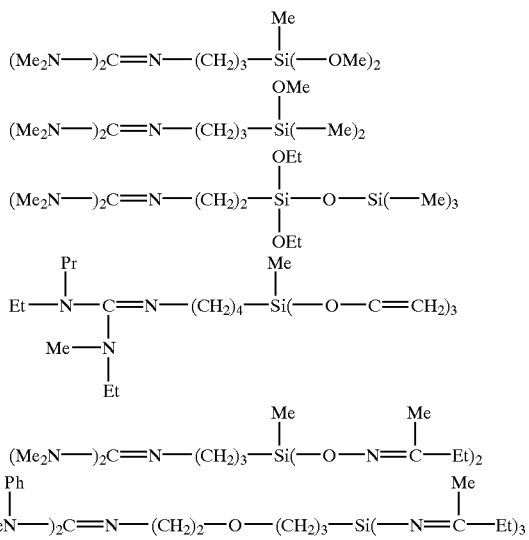

Of these, the organosilicon compound of the formula: $(Me_2N—)_2C=N—(CH_2)_2—Si(—OMe)_3$ is preferred for ease of synthesis.

Component (C) is preferably blended in an amount of 0.01 to 10 parts by weight, more preferably 0.1 to 5 parts by weight per 100 parts by weight of component (A). Too large an amount of component (C) may cause the reaction product to discolor and be uneconomical.

For enhancing the mechanical properties of silicone rubber elastomers, fumed silica, especially fumed silica whose surface has been treated with an organosilicon compound for hydrophobizing, is preferably added to the inventive composition. An appropriate amount of fumed silica blended is 1 to 100 parts by weight, especially 3 to 50 parts by weight per 100 parts by weight of component (A).

Fillers other than the aforementioned may also be blended. Suitable fillers include precipitated silica, diatomaceous earth; metal oxides such as iron oxide, zinc oxide, and titanium oxide, which may be surface treated with silane; metal carbonates such as calcium carbonate, magnesium carbonate and zinc carbonate; asbestos, glass wool, carbon black, finely divided mica, fused powder; and synthetic resin powders such as polystyrene, polyvinyl chloride, and polypropylene. Thixotropic agents for adjusting physical properties, heat resistance modifiers, colorants, tackifiers and the like may be added, if desired. Of these, the addition of tackifiers is preferred. Exemplary tackifiers are silane coupling agents such as amino radical-containing silane coupling agents and are preferably added in amounts of 0.1 to 10 parts by weight, especially 0.5 to 5 parts by weight per 100 parts by weight of component (A).

Condensation reaction catalysts used in conventional compositions of this type are also useful. Suitable catalysts include organotin compounds such as dibutyltin diacetate, dibutyltin dioctate, dibutyltin dilaurate, dibutyltin dioleate, diphenyltin diacetate, dibutyltin oxide, dibutyltin dimethoxide, dibutyl bis(triethoxysiloxy)tin, dibutyltin benzyl maleate; organotitanium compounds such as tetraisopropoxytitanium, tetrabutoxytitanium and titanium bisacetylacetonate. Catalysts are preferably added in amounts of 0.01 to 10 parts by weight, especially 0.05 to 5 parts by weight per 100 parts by weight of component (A).

The room temperature curable organopolysiloxane composition is prepared by mixing the above-mentioned components (A) to (C) in a kneader/mixer or planetary mixer.

Mixing may be done in the entirety or in divided portions. Also, components (A) to (C) may be mixed in a closed enclosure under reduced pressure. The mixing temperature ranges from room temperature to about 100° C.

The inventive composition thus obtained cures in the presence of moisture, forming a silicone rubber. The rubber elastomer has a good profile of heat resistance, weather resistance and low-temperature properties characteristic of silicone rubber, and is applicable in a wide range. With the passage of time after curing, this rubber elastomer does evolve essentially no low-molecular-weight siloxanes and organic matter. Specifically, as measured by the substrate surface adsorption-thermal desorption method (the adsorption test on silicon wafer, JACA No. 34), the quantity of low-molecular-weight siloxanes and organic matter arising from the cured composition (or rubber elastomer) is up to 1.0[ng $C_{16}$(n–$C_{16}H_{34}$) equivalent/$cm^2$ on calculation], i.e., (ng$C_{16}$eq./$cm^2$).

The room temperature curable organopolysiloxane compositions of the invention are suited as sealants in clean rooms and adhesives and sealants in electrical and electronic applications, especially as sealants in semiconductor clean rooms. Specifically, the compositions are suited as seals used in the construction of clean rooms (joint seals and panel seals), seals used in the installation of clean room facilities (air-tight seals on ducts and piping), seals on members used in the construction and facility installation of clean rooms (seals on prefabricated panels, filters and other members to be carried in for installation), seals used in semiconductor manufacturing apparatus (air-tight seals on apparatus, stock tools and the like), seals on utility piping for electricity and gas feed to semiconductor manufacturing apparatus (air-tight seals on ducts and piping).

EXAMPLE

Examples of the invention are given below by way of illustration and not by way of limitation. All parts are by weight and viscosity is a measurement at 25° C.

Example 1

A base compound was prepared by uniformly mixing 85 parts of a dimethylpolysiloxane (1) capped with a hydroxyl radical at either end, containing 0.05% by weight of low-molecular-weight organopolysiloxanes having a vapor pressure of at least $10^{-12}$ mmHg, and having a viscosity of 5,000 cSt, with 15 parts of fumed silica surface treated with dimethyldichlorosilane. Then 100 parts of the base compound was blended with 6 parts of phenyltriisopropenoxy-silane, 0.5 part of γ-tetramethylguanidylpropyltrimethoxy-silane and 1 part of γ-aminopropyltriethoxysilane. They were intimately mixed in a humidity-shielded vacuum atmosphere, yielding a room temperature curable organopolysiloxane composition.

Example 2

A base compound was prepared by uniformly mixing 85 parts of the dimethylpolysiloxane (1) capped with a hydroxyl radical at either end, containing 0.05% by weight of low-molecular-weight organopolysiloxanes having a vapor pressure of at least $10^{-12}$ mmHg, and having a viscosity of 5,000 cSt, with 15 parts of fumed silica surface treated with dimethyldichlorosilane. Then 100 parts of the base compound was blended with 6 parts of vinyltriisopropenoxy-silane, 0.5 part of γ-tetramethylguanidylpropyltrimethoxy-silane and 1 part of γ-aminopropyltriethoxysilane. They were intimately mixed in a humidity-shielded vacuum atmosphere, yielding a room temperature curable organopolysiloxane composition.

Comparative Example 1

A base compound was prepared by uniformly mixing 85 parts of the dimethylpolysiloxane (1) capped with a hydroxyl radical at either end, containing 0.05% by weight of low-molecular-weight organopolysiloxanes having a vapor pressure of at least $10^{-12}$ mmHg, and having a viscosity of 5,000 cSt, with 15 parts of fumed silica surface treated with dimethyldichlorosilane. Then 100 parts of the base compound was blended with 6 parts of vinyltributanoxime-silane, 0.1 part of dibutyltin dioctate and 1 part of γ-aminopropyltriethoxysilane. They were intimately mixed in a humidity-shielded vacuum atmosphere, yielding a room temperature curable organopolysiloxane composition.

Comparative Example 2

A base compound was prepared by uniformly mixing 85 parts of the dimethylpolysiloxane (1) capped with a hydroxyl radical at either end, containing 0.05% by weight of low-molecular-weight organopolysiloxanes having a vapor pressure of at least $10^{-12}$ mmHg, and having a viscosity of 5,000 cSt, with 15 parts of fumed silica surface treated with dimethyldichlorosilane. Then 100 parts of the base compound was blended with 6 parts of vinyltrimethoxysilane, 1 part of tetrabutoxytitanate and 1 part of γ-aminopropyl-triethoxysilane. They were intimately mixed in a humidity-shielded vacuum atmosphere, yielding a room temperature curable organopolysiloxane composition.

Comparative Example 3

A base compound was prepared by uniformly mixing 85 parts of a dimethylpolysiloxane (2) capped with a hydroxyl radical at either end, containing 0.5% by weight of low-molecular-weight organopolysiloxanes having a vapor pressure of at least $10^{-3}$ mmHg, and having a viscosity of 5,000 cSt, with 15 parts of fumed silica surface treated with dimethyldichlorosilane. Then 100 parts of the base compound was blended with 6 parts of phenyltriisopropenoxy-silane, 0.5 part of γ-tetramethylguanidylpropyltrimethoxy-silane and 1 part of γ-aminopropyltriethoxysilane. They were intimately mixed in a humidity-shielded vacuum atmosphere, yielding a room temperature curable organopolysiloxane composition.

The room temperature curable organopolysiloxane compositions of Examples and Comparative Examples were formed into sheets of 2 mm thick, and cured for 7 days in an atmosphere of 23±2° C. and RH 50±5%. Physical properties (hardness, elongation at break, and tensile strength according to JIS K6249) of the sheets were measured, and the quantity of low-molecular-weight siloxanes and organic matter was measured by the substrate surface adsorption-thermal desorption method (according to the adsorption test on silicon wafer, JACA No. 34). The results are shown in Table 1.

TABLE 1

|  |  | Example | | Comparative Example | | |
|---|---|---|---|---|---|---|
|  |  | 1 | 2 | 1 | 2 | 3 |
| Composition (pbw) | Dimethylpolysiloxane (1) | 85 | 85 | 85 | 85 | |
|  | Dimethylpolysiloxane (2) |  |  |  |  | 85 |
|  | Fumed silica | 15 | 15 | 15 | 15 | 15 |
|  | Phenyltriisopropenoxysilane | 6 |  |  |  | 6 |
|  | Vinyltriisopropenoxysilane |  | 6 |  |  |  |
|  | Vinyltributanoximesilane |  |  | 6 |  |  |
|  | Vinyltrimethoxysilane |  |  |  | 6 |  |
|  | γ-tetramethylguanidylpropyl trimethoxysilane | 0.5 | 0.5 |  |  | 0.5 |
|  | Dibutyltin dioctate |  |  | 0.1 |  |  |
|  | Tetrabutoxytitanate |  |  |  | 1 |  |
|  | γ-aminopropyltriethoxysilane | 1 | 1 | 1 | 1 | 1 |
| Physical properties | Hardness (Durometer A) | 40 | 41 | 40 | 38 | 40 |
|  | Elongation at break (%) | 400 | 380 | 390 | 370 | 410 |
|  | Tensile strength (MPa) | 2.5 | 2.4 | 2.4 | 2.2 | 2.5 |
| Emissions* | Siloxanes | 0.01> | 0.01> | 0.01> | 0.30 | 1.7 |
|  | Organic matter other than siloxanes | 0.04 | 0.04 | 1.40 | 1.50 | 0.04 |
|  | Total organic matter | 0.04 | 0.04 | 1.40 | 1.80 | 2.10 |

*measured by the substrate surface adsorption-thermal desorption method (JACA No. 34)
unit: $(ngC_{16}eq./cm^2)$ It is demonstrated that the emission of low-molecular-weight siloxanes and organic matter from the inventive room temperature curable organopolysiloxane compositions is minimized.

There has been described a room temperature curable organopolysiloxane composition which emits little or no low-molecular-weight siloxanes and organic compounds and is suitable for use as a sealant in a clean room and as an adhesive on electrical and electronic parts. The composition is also useful as sealants and coatings to various substrates and sealants to semiconductor manufacturing apparatus and electricity and gas utility piping.

Japanese Patent Application Nos. 2001-315055 and 2002-075571 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A room temperature curable organopolysiloxane composition comprising:
   (A) 100 parts by weight of a diorganopolysiloxane end-capped with a hydroxyl, alkoxy or alkenoxy radical and containing up to 0.1% by weight of low-molecular-weight organopolysiloxanes having a vapor pressure of at least $10^{-12}$ mmHg at 20° C.,
   (B) 0.5 to 30 parts by weight of a silane compound having a radical of the following general formula (1):

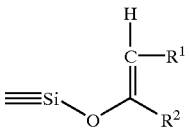

(1)

wherein $R^1$ and $R^2$ are independently hydrogen or a substituted or unsubstituted monovalent hydrocarbon radical, or a partial hydrolytic condensate thereof, and
   (C) 0.01 to 10 parts by weight of an organosilicon compound having a monovalent radical of the following general formula (2):

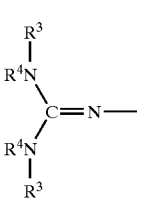

(2)

wherein $R^3$ and $R^4$ are independently hydrogen or a monovalent hydrocarbon radical, or a partial hydrolytic condensate thereof,
   said composition being capable of being cured into a silicone rubber producing up to 1.0 $(ngC^{16}eq./cm^2)$ of low-molecular-weight siloxanes and organic matter as measured by the substrate surface adsorption-thermal desorption method (the adsorption test on silicon wafer, JACA No. 34).

2. The room temperature curable organopolysiloxane composition of claim 1, further comprising 1 to 10 parts by weight of surface hydrophobized, fumed silica.

3. The room temperature curable organopolysiloxane composition of claim 1, for use as a clean room sealant.

4. The room temperature curable organopolysiloxane composition of claim 1, for use as a sealant or adhesive in the electric and electronic field.

5. The room temperature curable organopolysiloxane composition of claim 1, for use as a sealant in semiconductor manufacturing apparatus and utility piping for electricity and gas.

6. A room temperature curable organopolysiloxane composition of claim 1, wherein the diorganopolysiloxane has the compositional formula:

wherein $R^5$ is a substituted or unsubstituted monovalent hydrocarbon radical and c is 1.90 to 2.05 and is end-capped with a hydroxyl, alkoxy or alkenoxy radical.

7. A room temperature curable organopolysiloxane composition as in claim 6 wherein the diorganopolysiloxane is represented by the formula:

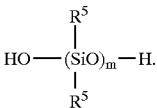

8. A room temperature curable organopolysiloxane composition as in claim 6, wherein the viscosity of the diorganopolysiloxane at 25° C. is at least about 300 to about 100,000 cSt.

9. A room temperature curable organopolysiloxane composition as in claim 1, wherein the silane compound has the formula (3):

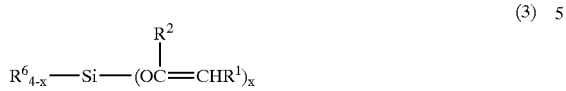
(3)

or partial hydrolytic condensate thereof, wherein $R^6$ is a monovalent hydrocarbon radical having 1 to 8 carbon atoms.

10. A room temperature curable organopolysiloxane composition as in claim 1, wherein said silane compound is used in an amount of 1 to 15 parts by weight per 100 parts by weight of the diorganopolysiloxane.

11. A room temperature curable organopolysiloxane composition as in claim 1, comprising the organosilicon compound has the formula (4):

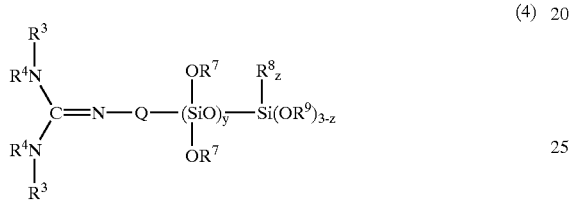
(4)

wherein $R^3$ and $R^4$ are as defined above; Q is an alkylene or oxyalkylene radical of 1 to 6 carbon atoms; $R^8$ is hydrogen, a monovalent hydrocarbon radical of 1 to 8 carbon atoms, or —$OSIR^8{}_a(OR^9)_{3-a}$ wherein "a" is 0, 1 or 2; $R^9$ is hydrogen or a monovalent hydrocarbon radical of 1 to 8 carbon atoms; y is an integer of 0 to 5, and z is 0, 1 or 2.

12. A method of decreasing the production of low-molecular-weight siloxanes from a silicone rubber of a room temperature curable organopolysiloxane composition, the method comprising the steps of:
preparing a room temperature curable organopolysiloxane composition comprising
(A) 100 parts by weight of a diorganopolysiloxane end-capped with a hydroxyl, alkoxy or alkenoxy radical and containing up to 0.1% by weight of low-molecular-weight organopolysiloxanes having a vapor pressure of at least $10^{-12}$ mmHg at 20° C.,
(B) 0.5 to 30 parts by weight of a silane compound having a radical of the following general formula (1):

(1)

wherein $R^1$ and $R^2$ are independently hydrogen or a substituted or unsubstituted monovalent hydrocarbon radical, or a partial hydrolytic condensate thereof, and
(C) 0.01 to 10 parts by weight of an organosilicon compound having a monovalent radical of the following general formula (2):

(2)

wherein $R^3$ and $R^4$ are independently hydrogen or a monovalent hydrocarbon radical, or a partial hydrolytic condensate thereof, and
curing said composition into a silicone rubber which produces up to 1.0 $ngC_{16}eq./cm^2$ of low-molecular-weight siloxanes and organic matter as measured by the substrate surface adsorption-thermal desorption method (the adsorption test on silicon wafer, JACA No. 34).

* * * * *